June 15, 1937. E. S. LARSON Re. 20,410
MAGAZINE SHIFT FOR LINE CASTING AND COMPOSING MACHINES
Original Filed Jan. 8, 1934 2 Sheets-Sheet 1
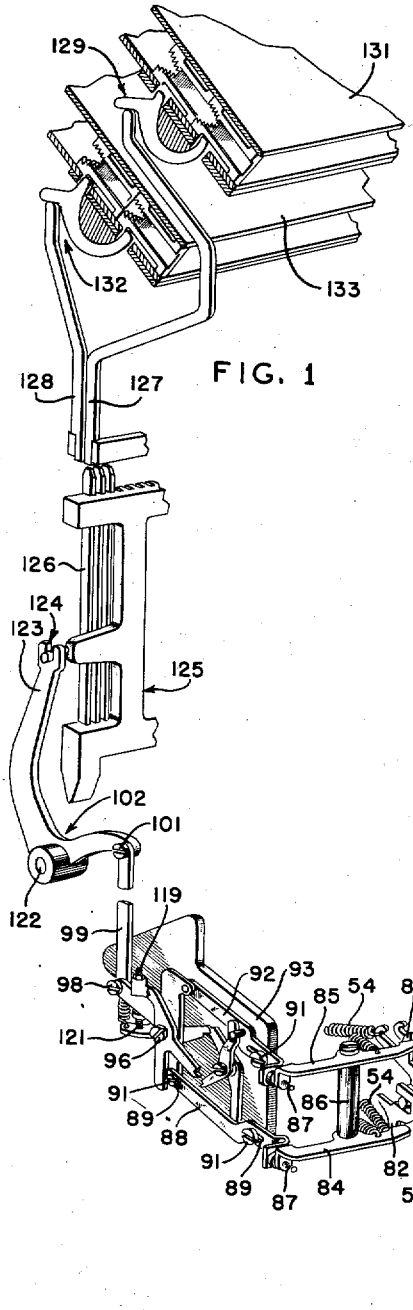
FIG. 1
FIG. 4
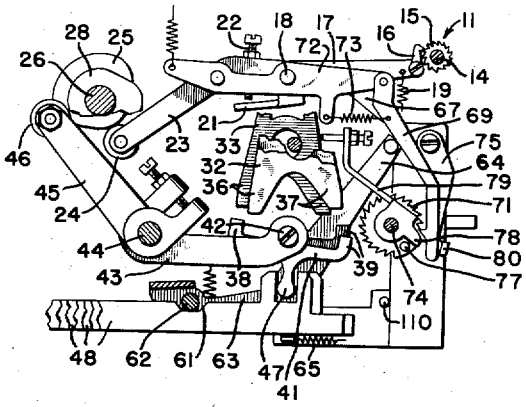
FIG. 5
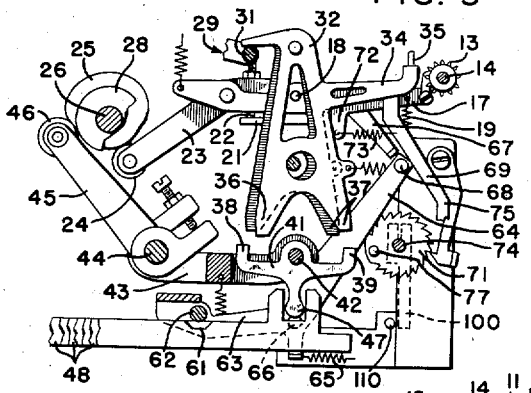
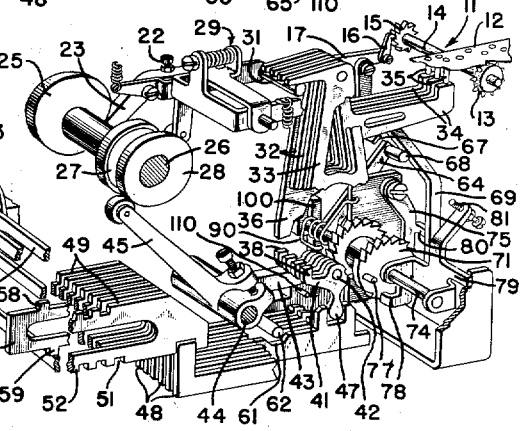
INVENTOR.
EDWARD S. LARSON
BY H. B. Whitfield
ATTORNEY.

June 15, 1937. E. S. LARSON Re. 20,410
MAGAZINE SHIFT FOR LINE CASTING AND COMPOSING MACHINES
Original Filed Jan. 8, 1934 2 Sheets-Sheet 2
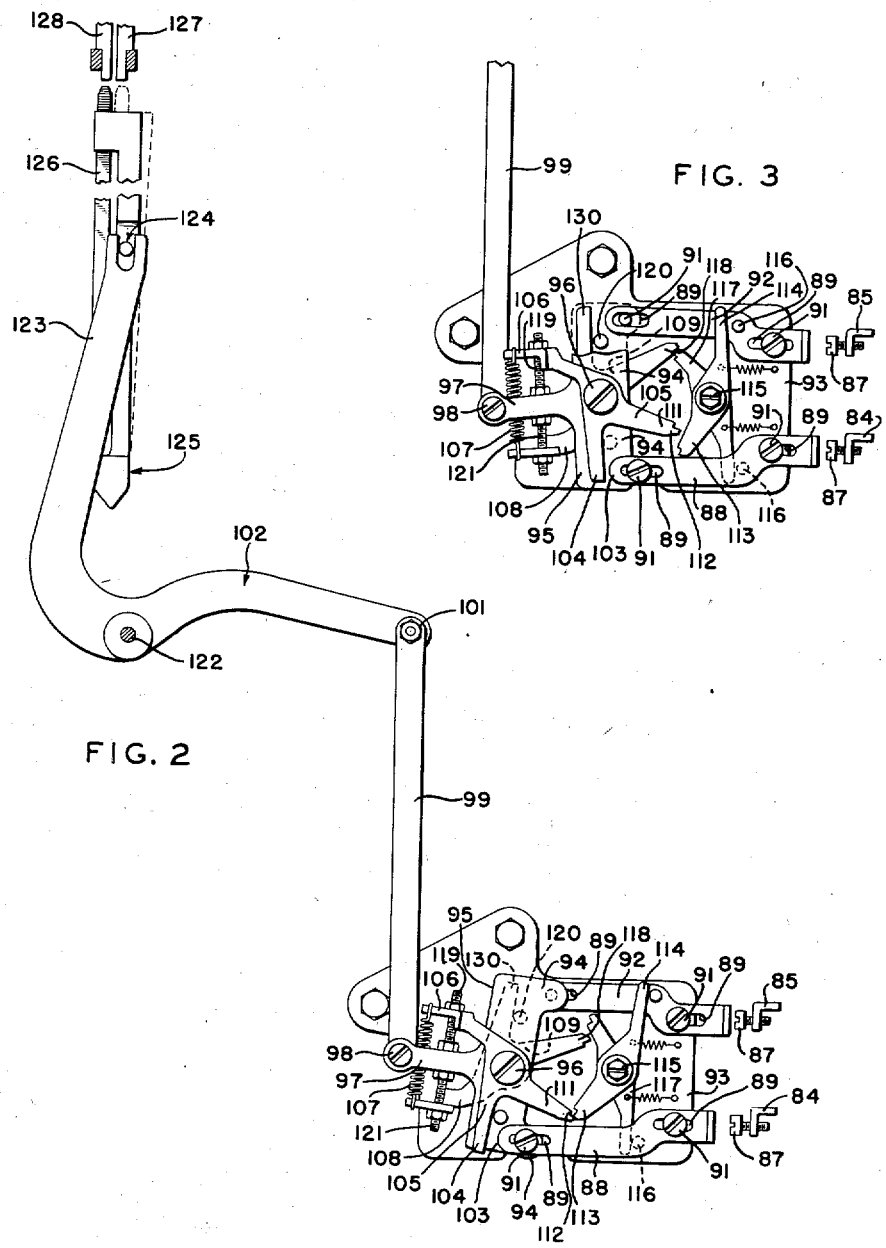
INVENTOR.
EDWARD S. LARSON
BY H. B. Whitfield.
ATTORNEY.

Reissued June 15, 1937

Re. 20,410

UNITED STATES PATENT OFFICE 20,410

MAGAZINE SHIFT FOR LINE CASTING AND COMPOSING MACHINES

Edward S. Larson, Chicago, Ill., assignor, by mesne assignments, to Teletypesetter Corporation, a corporation of Delaware Original No. 2,036,282, dated April 7, 1936, Serial No. 705,646, January 8, 1934. Renewed March 28, 1935. Application for reissue July 6, 1936, Serial No. 89,259

22 Claims. (Cl. 199—19)

The present invention relates to linecasting and composing machines and more particularly to improvements in automatic control mechanisms for the operation thereof.

This application embodies an improvement relating to the subject matter concerned in copending applications Serial Nos. 584,387 and 721,657 filed January 2, 1932 and April 21, 1934, respectively.

Linecasting and composing machines of the commercially well-known types are frequently provided with a plurality of matrix storage magazines sometimes located one above the other in vertical alignment and at other times one alongside the other in horizontal alignment. The purpose in providing more than one such magazine is to afford increased variety or selectivity under the control of a single operating unit, or, in a more limited sense, under control of a single set of release reeds. Thus with a given number of matrix release reeds which are equivalent in number to the number of classes of matrices in one storage magazine and by providing means for shifting said release reeds collectively they may be made to serve an additional one or ones of a plurality of matrix storage magazines, and by having associated with each magazine a certain class of matrices, the total number of selections is thereby materially increased.

The shifting of a common set of release reeds to associate them with each of a plurality of storage magazines involves the moving of matrix release elements any one of which may be out of normal or idle position due to its actuation to release a matrix and its failure to return to idle position before the shifting is begun. Accordingly, where automatic units are employed for the control and operation of linecasting and composing machines and where, in addition, it is desired to employ the automatic means for shifting the release reeds between each of a plurality of magazines, it is desirable that a proper time delay interval precede the execution of each shift operation and that the record reading apparatus which is responsive to stored signals be momentarily arrested in order to allow a sufficient amount of time for previously operated reeds to return to rest position and for released matrices to be properly assembled and for preventing the idle operation of the sensing apparatus. It is also desirable to arrest the progress of the control form or perforated tape during the delay interval in order that the reception of subsequent matrix release signals may be suspended until the release reeds have been completely shifted and are brought into alignment with the newly selected magazine escapements.

The main object of the present invention is the provision of means for automatically shifting a set of release reeds between each of several matrix storage magazines under the control of stored signals.

According to the invention there is provided means for arresting the signal sensing mechanism and for suspending operation of the line composing control mechanism for a predetermined period.

In order to describe the present invention, a preferred embodiment thereof has been illustrated in the accompanying drawings and is particularly described in the following specification. This adaptation of the present invention is designed to be applied to mechanisms such as that disclosed in United States copending applications serially numbered 600,606, filed March 23, 1932, and 704,467, filed December 29, 1933. In accordance with the provisions thereof, a record reader mechanism is employed having a constantly rotating control shaft that is operative to periodically withdraw and permit to be returned a set of tape sensing levers. The same shaft is also operative upon a signal transfer mechanism and in accordance with the variable position of the several sensing levers causes the transfer of a set of code signals to a corresponding set of code selector bars. The position of the several selector bars then affords a selective clearance to one of a plurality of individual elements which thereupon is permitted to be moved into effective position where, under the influence of a common actuator, it receives an actuating motion with which it initiates the particular performance for which it is delegated.

It is contemplated, in accordance with the present adaptation, to control the shifting of a set of common release reeds between the escapement mechanisms of each of a pair of magazines located one above the other and to be referred to hereinafter as the main and the auxiliary matrix magazines. The release reeds are carried in a carriage or cradle member that is capable of being reciprocated laterally so as to present an adjacent portion of the release reeds in operative alignment with one or another of a corresponding set of escapement mechanisms. The shifting of the carriage is effected through the agency of a series of levers and bell cranks which are under the control of a pair of symmetrically similar and opposite actuating levers each of which is selectively set into its effective position and tends to perform its shift operation through the medium of a spring element which receives and momentarily stores the shift impulse under relatively instantaneous control to await the more sluggish or slower response of the magazine shifting linkage.

The pair of spring urged actuating levers are selectively set by a corresponding pair of bars which in turn are under the control of a pair of pivoted levers that extend into the region of and are controlled by one pair of the plurality of selectable elements which are under the control of record reader mechanisms mentioned above. The arrangement of the levers is such that the selection and operation of one concurrently effects the release of the other.

For a better or more comprehensive understanding of the present invention, reference may be had to the accompanying drawings in which like reference characters designate similar parts throughout and in which Fig. 1 is a perspective view of portions of a tape sensing mechanism and a line composing machine embodying the present invention having certain portions broken away or omitted for the sake of clearness;

Fig. 2 is a side elevational view of the control reed shifting mechanism;

Fig. 3 is a fragmentary elevational view of a portion of the mechanism illustrated in Fig. 2 showing another condition of operation thereof;

Fig. 4 is a transverse sectional view through the record reader mechanism illustrated in Fig. 1, and Fig. 5 is a transverse sectional view similar to Fig. 4 but illustrating another condition of operation thereof.

In the accompanying drawings the reference character 11 indicates generally a record reader mechanism which is adapted to receive a continuous web of material 12 fed through the medium of a sprocket wheel 13 that is carried upon a shaft 14. A ratchet wheel 15 also secured to shaft 14 receives intermittent motion under the impulses imparted to it by a reciprocating pawl 16 pivotally supported upon the extremity of a lever 17 which is in turn pivoted upon a stud shaft 18 as better illustrated in Figs. 4 and 5. The lever 17 is normally urged in a clockwise direction by a spring 19 and responds thereto until an opposite extremity 21 thereof comes into contact with the end of an adjustment screw 22.

Another lever 23 also pivoted at 18 carries the adjustment screw 22 and is provided at its extremity with a follower roller 24 which engages and follows the periphery of a cam 25 secured to the record reader operating shaft 26, so called because in addition to the feed sprocket cam 25 it carries also two other cams 27 and 28 which together with cam 25 perform all of the functions incident to actuating the several elements which comprise the record reader 11.

Cam 27, Fig. 1, engages the following roller of a bail assembly 29 which, through its bail rod 31, periodically withdraws the several levers 32 and 33.

The levers 32 are in the present instance six in number and will be referred to hereinafter as feeler levers. They differ in one essential from the lever 33 by being provided with integrally formed arms 34 at the extremity of which are carried the feeler pins 35. Each revolution of the shaft 26 may be considered as the unit operating cycle, at a certain interval in which cam 25 operates to feed the tape 12, during another interval in which cam 27 withdraws the several feeler levers 32 and 33, and during a third interval in which cam 28 operates the transfer mechanism for relaying the signal as it is sensed by the several feeler levers 32 and lever 33. As the feeler pins 35 are permited to engage the tape 12, certain of them encounter perforations and are permitted to rotate in a counterclockwise direction until the feeler pins 35 protruding through the tape 12 permit the levers 32 to assume positions such as that exemplified by the foremost lever in Fig. 5, while certain others of them, failing to encounter such perforations in the tape 12, are thereby withheld from rotating to this extent and assume positions such as indicated by the posterior lever illustrated in Fig. 5. In accordance with the alternative placement of the levers 32 or 33 as thus indicated, their lowermost projections 36 and 37 are brought into registration with either one or the other of a pair of cooperating lugs 38 or 39 of corresponding transfer levers 41.

The transfer levers 41 are of Y-shaped configuration and correspond in number to the levers 32 and 33. The several transfer levers 41 are loosely pivoted upon a shaft 42 which forms part of a bail structure 43 rotatable about the axis 44. The bail 43 forms part of a bell crank assembly in its relation with the arm 45 which carries the follower roller 46 that in turn constitutes the contact member engaging the actuating cam 28.

Through the impulses received from cam 28, the bell crank assembly 43—45 is periodically rocked about shaft 44, thrusting the several Y-shaped transfer levers 41 upwardly and into engagement with their projections 36 or 37 in accordance with which the levers 41 are rocked correspondingly in a clockwise or counterclockwise direction depending upon the condition of their associated levers 32 or 33. Lowermost projections 47 of Y-shaped levers 41 comprise connection elements through which the levers 41 are articulated to a corresponding set of connecting bars 48 through which the condition transferred by the levers 41 is imparted to a set of code bars 49. The code bars 49 are provided with variously arranged notches 51 and projections 52 such that in accordance with each placement of the several of them an individual transverse alignment of the notches 51 is afforded, permitting a clearance thereby into which may be admitted an adadjacent one of a plurality of selectable elements 53.

Elements 53 are constantly spring urged by individual springs 54 and are momentarily permitted, in response to such urge, to seek admission into their respective alignment of notches 51, but since for each placement of the several code bars 49 there is permitted but a single alignment of notches 51, only one of the elements 53 may be thus selectively conditioned by admittance thereof into its alignment of notches. As will be fully understood by referring to the copending applications mentioned above, the selective conditioning of any of the elements 53 results in the ultimate performance of a certain function to which the particular element may be delegated. In the interest of explaining the present invention, two of the elements 53 specially indicated 55 and 56 are particularly significant in that they control the performance of the magazine shift mechanism about to be described. In this connection it is noted that among the code bars 49 one is specially indicated 57 and that this bar differs somewhat from the general class of bars 49 by being provided in this case with but two lugs 58 and 59 which normally register below the selectable elements 55 and 56, respectively.

The selection of either of the elements 55 or 56 is obtained upon the reception of either of two associated signals in accordance with a predetermined arrangement. Upon the reception of either of these two signals a certain condition is established peculiar thereto and differing thereby from any of the conditions that are established upon the reception of any other signals as will be indicated. While this special condition will be described as resulting from the reception of but these two indicated special signals, it may be observed that any number of signals may be made to respond with a similar result and that the particular signals have been arbitrarily selected so that, if desired any other particular signal or signal code may, if preferred, be substituted instead.

The response of the record reader 11 to either or any of these special signals is similar to the response of the general class of signals up to the point of positioning the several connecting rods 48. Each bar 48 is provided with a notch 61, Figs. 1, 4, and 5, individual to it and arranged with respect to the other notches 61 of the other bars 48 in a manner such that upon the reception of either or any of the specially delegated signals such as the ones which are to select the elements 55 and 56, the notches 61 are brought into transverse alignment affording a clearance, as in the case of the notches 51. In this case, however, there is admitted into the clearance a transversely extending rod 62 which is carried by a bell crank lever having a laterally extending arm 63 and an upwardly and rightwardly extending arm 64. A spring 65 urges the bell crank lever 63—64 in a counterclockwise direction and when the clearance permitted by the alignment of notches 61 admits the rod 62 thereinto, the bell crank is rotated about its pivot 66, allowing the upper extremity of arm 64 to move behind the extremity of a downwardly and rightwardly extending projection 67 integrally formed with tape advancing lever 17. The movement of arm 64 behind projection 67 occurs during the instant in which lever 17 is in its elevated position as illustrated in Fig. 4, preventing the return thereof in response to the urge of spring 19 and causing to be arrested thereby the further progress of tape advancing shaft 14 and its associated elements.

In addition to this result, the aforedescribed selective movement of bell crank lever 63—64 is manifest in a further result. Normally and before this selection a pin 68 secured to arm 64 engages a downwardly projecting pawl 69 and withholds it from operative engagement with a ratchet wheel 71. Pawl 69 is pivotally carried by an associate portion 72 which may be integrally formed with the constantly reciprocating lever 23. Pawl 69 is normally urged in a clockwise direction by a spring 73 so that it receives, at all times, a reciprocal motion under the actuation of lever 23, but until the selective movement of bell crank lever 63—64, the reciprocal motion of pawl 69 is ineffective. After the aforedescribed selection of bell crank lever 63—64, however, when pin 68 is withdrawn, the tooth of pawl 69 is permitted to come into engagement with the periphery of a ratchet wheel 71, causing to be imparted to the latter member a counterclockwise movement as viewed in Figs. 1, 4, and 5.

The motion imparted by pawl 69 to ratchet wheel 71 results in a progressive rotation of shaft 74 because of the detent effect of cooperating pawl 75 in association with a secondary ratchet wheel 76, Fig. 1. The rotation of shaft 74 under the stimulus of pawl 69 continues until a pin 77 carried by ratchet wheel 71 encounters a sidewardly extending lug 78 of a trip-off lever 79 loosely pivoted on shaft 74. When this occurs, the motion of shaft 74 is imparted to lever 79 which thereupon joins in the movement therewith until a condition is obtained such as that indicated in Fig. 4 when an adjustment screw 81 carried by lever 79 comes into contact with and subsequently moves lever 33 from its counterclockwise position, in which it is normally found, to its clockwise position as indicated in this figure.

Meanwhile, cam 29 continuing to rotate with shaft 26 imparts a reciprocating motion to the bail structure 43 and through it to the several transfer levers 41. But since the tape 12 is arrested at this time and the several levers 32 and 33 maintained in the same position by the registration of the particular code of signals in a dormant condition, no result or change of conditions is obtained by the reciprocal movement of the transfer levers 41. When, however, the special lever 33 is moved leftwardly by the continued rotation of shaft 74 and the motion imparted to it through lever 79 and screw 81, a new condition is established so that upon the succeeding reciprocal movement of the bail structure 43 when the transfer levers 41 are brought into engagement with the several levers 32 and 33, the particular transfer lever coming into engagement with special lever 33 is rotated in a clockwise direction, causing to be moved its connecting bar 48 rightwardly and thereby withdrawing the special code bar 57 in the same direction.

As the code bar 57 is withdrawn and with it its associated connecting bail 48, rod 62 is cammed out of the alignment of notches 61 by the displacement of the particular bar 48 associated with code bar 57. In so doing, bell crank 63—64 is rotated clockwise and the foremost portion of arm 64 is withdrawn from blocking projection 67. This frees lever 17 and permits it to resume tape feeding operations while at the same time pin 68 reengages pawl 69 and cams it away from ratchet wheel 71. Cooperating pawl 75 has integrally formed with it a backing strip 80, Fig. 1, so that as pawl 69 is withdrawn its cooperating pawl 75 is also withdrawn. This frees shaft 74 which then, in response to a spring 90, is restored to normal position as indicated in Figs. 1 and 5.

The normal position of shaft 74 is determined by the stop position at which an arm 100 (Figs. 1 and 5), which is angularly adjustable thereon, encounters the stop pin 110 which is anchored in the supporting structure. Where it is desired to vary the amount of time occupied by the aforedescribed mechanism in effecting a delay, it is but necessary to vary the angular position of arm 100 with respect to shaft 74, or in other words, to vary the number of teeth which intervene the normal or stop position of shaft 74 and the point at which pin 77 encounters the projection 78 of trip-off lever 79.

As was stated before, the signals which started into operation the mechanism under the control of the alignment of notches 61 belong to a class which in the present case is adapted to place into selective condition two of the plurality of selectable elements indicated 55 and 56. Upon the proper alignment of the several code bars 49, in response to the particular signals, a row of notches 51 is brought into alignment for the selective conditioning of either element 55 or element 56, but due to the normal position of the projections 58 or 59 the particular element 55 or 56 is not permitted to enter into the transverse clearance that is afforded by the notches 51 of the remaining code bars 49. This condition prevails during the time in which shaft 74 proceeds to rotate as described above. At the conclusion of this operation when the special lever 33 is displaced and its changed condition is transmitted into a movement of code bar 57, the projections 58 and 59 are withdrawn momentarily, permitting the particular one of the elements 55 or 56 to enter into selective condition and to promptly complete the operation for which it is delegated.

In carrying out the functions of the particular invention, elements 55 and 56 cooperate in a reciprocal manner, and are found most conveniently arranged in symmetrically opposite relationship as indicated in Fig. 1, under which condition element 55 has a downwardly extending projection 82 while element 56 has a similar upwardly extending projection 83. Projections 82 and 83 cooperate with a pair of first class levers 84 and 85 which are pivotally supported in spaced relation with respect to each other upon a vertically extending post 86. For purposes of regulation, levers 84 and 85 are provided with adjustment screws 87, indicated also in Figs. 2 and 3.

Upon its selective movement either of the levers 55 or 56, is thrust forwardly, as indicated in Fig. 1, rocking its associated lever 84 or 85 in a clockwise direction. In the case of lever 84 this motion is imparted to an associated bar 88 which is confined to limited horizontal motion by the slots 89 and its supporting screws 91. In the case of lever 85 the motion is imparted to a similar but symmetrically opposite bar 92, Figs. 2 and 3. Bar 92 is similarly provided with slots 89 and supporting screws 91. As viewed in Fig. 2, the right-hand screws 91 of bars 88 and 92 are secured to a base plate 93, but the left-hand screws 91 are carried in the oppositely extending arms 94 of a T-shaped lever 95 that is centrally pivoted at 96. A sidewardly extending arm 97 of lever 95 is pivotally articulated at 98 to a link 99 which is in turn connected at 101 to a bell crank 102.

The movement of either bar 88 or 92 in response to the selective motion imparted to it which originates with its element 55 or 56 is adapted to move link 99 upwardly or downwardly for the purpose of shifting a common set of release reeds 126 into communicating relation with one or another of a pair of sets of matrix escapement bars 127 and 128, and, in addition, is adapted to release its associated element 88 or 92 from its previously set position. The manner in which this is accomplished may be best perceived by comparing Figs. 2 and 3, supposing a condition existent as illustrated in Fig. 3 in which the mechanism is disposed to render the main magazine in effective condition. The alternative will then be as illustrated in Fig. 2 with the auxiliary magazine in effective condition. To obtain this end, element 84 is selectively operated causing its screw 87 to engage bar 88 and shift the latter member leftwardly. With this, the foremost end 103 of bar 88 is brought into engagement with arm 104 of a three-armed lever 105 that is also pivoted at the pivot screw 96. This causes lever 105 to be rotated in a clockwise direction. In so doing, another arm 106 of lever 105 being connected to a spring 107, the other end of which is secured to an arm 108 of a similar lever 109, causes the stretching of spring 107, and thereby storing the operative impulse, which originated with the selective movement of element 55, within the spring 107. After bar 88 has moved through a predetermined distance and lever 105 has been rotated from the position indicated in Fig. 3 until its approximate position as indicated in Fig. 2, another arm 111 of lever 105, which is provided with a shouldered tooth 112, becomes latched behind the projection 113 of a spring loaded pawl 114 pivoted at 115. At about the same time a pin 116 which may be integrally formed with bar 88 and engaging one end of another pawl 117 similar to but in symmetrically opposite relationship with pawl 114 rocks the latter member clockwise into the position as indicated in Fig. 2 and thereby releases its hold at projection 118 of lever 109. When lever 109 is thus freed, it responds to the urge of spring 107 rotating clockwise from the position indicated in Fig. 3 to that indicated in Fig. 2 when its arm 130 encounters a stop pin 120. Levers 105 and 109 are provided in their arms 106 and 108 with coacting screws 119 and 121 arranged in opposite abutting relation and receiving between them the arm 97 of T-shaped lever 95.

Thus when lever 109 is freed by the release of its pawl 117 and is permitted to assume a position such as that illustrated in Fig. 2, its clockwise motion is imparted through screw 121 to the lever 95, thrusting arm 97 upwardly and accordingly moving link 99 upwardly. This rotates bell crank 102 in a counterclockwise direction about its pivot 122. In so doing, the upstanding arm 123 of bell crank 102 is rocked to the left. The motion of arm 123 is transmitted through its pin and slot articulation 124 to a cradle structure 125 within which is supported a set of release reeds 126, moving the latter from their previous position in registration with the escapement bars 127 of the main magazine, Figs. 1 and 2, and into registration with another set of escapement bars 128 of the auxiliary magazine.

The release reeds 126 are free to partake of limited vertical movement under the actuation of manual control keylevers or automatic control keylevers as fully explained and illustrated in the copending applications referred to above. This motion by reeds 126 may be communicated to the bars 127 or 128 in accordance with the placement of cradle 125. As illustrated in Fig. 1, cradle 125 is disposed to permit the cooperation between reeds 126 and bars 127, whereas in the showing of Fig. 2 the reeds 126 are illustrated in full line position as disposed to register with bars 128.

The bars 127 cooperate each with an individual escapement device, generally indicated 129, of an upper storage magazine 131, referred to as the main magazine, while the bars 128 cooperate with other but similar escapement devices 132 which are associated in corresponding manner with a lower matrix storage magazine 133, referred to as the auxiliary storage magazine. In accordance with its relationship with main magazine 131 or auxiliary magazine 133, the release bars 127 may be referred to as the main release bars, while those indicated 128 as the auxiliary release bars. It may be explained that with the cradle 125 in position to permit the registration of reeds 126 with the main release bars 127, line composition may continue indefinitely with the matrices released from the magazine 131. In a similar manner with cradle 125 in its alternative condition and reeds 126 in registration with the auxiliary bars 128, line composition may likewise continue indefinitely, depending, of course, upon the character of matrices in each magazine 131 or 133 and upon the desired font or type classification which it may be desired to use.

In accordance with the foregoing description of the shifting operation, a cradle 125 was described in its transit from main magazine composition to auxiliary magazine composition. The movement in the reverse direction is identically similar in all respects except as to the symmetrically opposite movement of the several elements. In this case bar 56 is selected and is likewise delayed from completing its selective movement by the blocking of projection 59. After the intervention of a predetermined delay interval when bar 57 is withdrawn, element 56 is permitted to assume selective condition and in being moved forwardly, its projection 83 rocks lever 85 in a clockwise direction, thrusting bar 92 leftwardly as viewed in Figs. 1, 2, and 3. The movement of bar 92 is transmitted to lever 109, as in the case of bar 88 and lever 105, until the latching arm of bar 109 comes into engagement with tooth 118 of pawl 117. Thus the lever 109 moves from a position such as that indicated in Fig. 2 to a new position such as that indicated in Fig. 3.

The continued movement of bar 92 causes its pin 116 to release pawl 114, freeing lever 105, whereupon spring 107 urges lever 105 to resume its original position as illustrated in Fig. 3. In so doing, screw 119 forces arm 97 downwardly, pulling link 99 in the same direction and rocking bell crank 102 clockwise about pivot 122. This shifts cradle 125 from its auxiliary back to its main position.

The shifting of cradle 125 from cooperative relation with the bars 127 and 128 is an operation to be delayed until any of the previously lifted reeds 126 have settled sufficiently for their extremities to clear the bars 127 and 128 in order that there may be no interference between the reeds 126 and the bars 127 and 128 during the operation of shifting cradle 125. For this reason where it is desired to mix, in a single line of composition, the matrices of main magazine 131 and the auxiliary magazine 133, and where, in accordance with such a purpose, the movement of cradle 125 may be executed in the midst of a single line of composition or even several times during a single line of composition, the foregoing described structure is especially designed to introduce a time delay interval between the instant when a magazine shift signal is received in the tape 12 and the instant at which either element 55 or 56 is selectively operated. This time delay interval permits any matrices which have been previously released to be fully and properly received in the assembling block while it also allows any previously selected reed 126 to complete its matrix releasing operation and to return to a point where its extremity is free of bars 127 and 128 before the shifting operation is begun. In addition, the arresting of the movement of tape 12 by the intervention of arm 64 momentarily suspends the operation of the record reader 11 until the shifting of cradle 125 may have had time to be fully executed.

It will be understood that numerous modifications and variations may be made without departing from the spirit and scope of the present invention. For this reason it is intended not to be limited to the specific language of the foregoing specification nor to the detailed illustrations in the accompanying drawings but to be permitted instead a latitude of interpretation as indicated by the hereunto appended claims.

What is claimed is:

1. In a linecasting and composing machine, a plurality of matrix storage magazines, a set of matrix release elements, means for associating said elements with each of said magazines, apparatus responsive to stored signals for actuating said associating means, and a delay mechanism for suspending the performance of said associating means in its response to said stored signals for the duration of a predetermined time interval.

2. In a linecasting and composing machine, a plurality of matrix storage magazines, a line composing mechanism including apparatus capable of being placed into communicable association with said magazines individually, a record reader responsive to stored signals for initiating the performance of said composing mechanism, means under the control of said record reader for shifting said apparatus between said magazines, and a delay factor for momentarily suspending the response of said shifting means to its control by said record reader until preceding line composition functions shall have had time to be fully consummated.

3. In a linecasting and composing machine, a plurality of matrix storage magazines, a line composing mechanism including apparatus capable of being placed into communicable association with said magazines individually, a record reader responsive to stored signals for initiating the performance of said composing mechanism, means under the control of said record reader for shifting said apparatus into association with each of said magazines, and means effective during the selective period of said shifting means for momentarily suspending the performance of said record reader.

4. In a linecasting and composing machine, a composing mechanism including a number of matrix release elements, a plurality of magazines, a supporting structure for said elements, means for moving said structure for thereby regulating the communicative relation between said elements and each of said magazines, a signal controlled apparatus for initiating the performance of said release elements and said moving means, and means for disabling the performance of said signal controlled apparatus during the interval of selection of said moving means.

5. In a line composing machine, a plurality of matrix magazines each having a number of storage channels, a composing mechanism including a set of matrix release elements corresponding to the channels of each of said magazines, a record reader under the control of various signal codes for accordingly operating said release elements, means under the control of certain ones of said codes in response to said record reader for associating said composing mechanism with said magazines alternatively, and a device associated with said record reader and responsive to said certain codes for momentarily delaying the performance of said associating means and for momentarily suspending the operation of said record reader.

6. In a linecasting and composing machine, a plurality of magazines, a control mechanism, automatic means responsive to stored signals for associating said control mechanism with each of said plurality of magazines including a pair of selectable actuating elements, latching means associated with said elements, and an intermediate member connecting said elements reciprocally so that the actuating movement of each effects the restorative movement of the other.

7. The combination set forth in claim 6, including spring means associated with said actuating elements and said latching means for storing the actuating impulses to accommodate for the inertia of said magazines and said associating means.

8. In a linecasting and composing machine, the combination of a pair of matrix storage magazines, a composition controlling device adapted to be associated with each of said magazines alternatively, an automatic control mechanism for initiating a shift movement of said composition controlling device between said pair of magazines including an element individually selectable for shifting in one direction and an element individually selectable for shifting in the other direction, and means receiving motion from said elements for executing said shift operations including a spring agency for momentarily receiving and storing the operating impulses.

9. In a linecasting machine, a composition controlling mechanism capable of assuming two conditions of operation, a linkage through which said mechanism is shifted from one condition of operation to the other including a spring element operative in both directions, and latching means cooperating with said spring element for storing an operating impulse in each direction.

10. In a linecasting machine, a plurality of matrix carrying magazines, a composition controlling mechanism capable of assuming operative association with each of said magazines individually, a linkage through which said mechanism is moved from one operative association to another including resilient means operative in each direction of movement, and latching means cooperating with said resilient means for storing each operative impulse.

11. In a linecasting and composing machine, a main matrix magazine, an auxiliary matrix magazine, a composing mechanism including a set of release elements alternatively shiftable between said main and said auxiliary magazines, apparatus for shifting said set of elements including an operating lever for shifting in one direction and latching means therefor, an operating lever for shifting in the other direction and latching means therefor, a common element for receiving the operating motion from each of said levers, and a spring connecting said levers and comprising a means during the operation of each of said levers for restoring the other of said levers and for momentarily storing the operating impulses communicated through said levers.

12. In a linecasting and composing machine, a set of elements shiftable into communicative relation with each of a plurality of replaceable matrix storage magazines, an automatic control mechanism for selectively operating said set of elements in correspondence with various stored signals, means responsive to certain of said stored signals received by said control mechanism for shifting said set of elements, a delay factor associated with said shifting means for momentarily suspending the performance thereof in response to said control mechanism, and regulating means for varying the time interval of said delay in accordance with predetermined requirements.

13. In a linecasting and composing machine, a set of actuators shiftable into communicative relation with each of a plurality of matrix storage magazines, a shifting device for moving said set of actuators from one position to another, a record reader responsive to the signals in a perforated control form for operating said set of actuators and said shifting device including a continuously rotatable operating shaft, and means for disabling said record reader without arresting said shaft.

14. In a linecasting and composing machine, a shifting device for effecting the movement of a subordinated apparatus into two conditions comprising an immediate connecting element for executing the shift operation, a pair of coacting elements disposed for symmetrically opposite impulsion each to each and arranged one upon each side of said immediate connecting element, a latch associated with each of said coacting elements for holding it in its effective position, and a pair of actuating members of symmetrical and inverse performance, each effecting upon its actuation an operative movement of one of said coacting elements and a release movement of the latch associated with the other of said coacting elements.

15. In a linecasting and composing machine, a composing mechanism including a number of matrix release elements, a plurality of magazines, a supporting structure for said elements, means for moving said structure and thereby regulating the communicative relation between said elements and each of said magazines, a signal controlled apparatus for initiating the performance of said release elements and said moving means, means for postponing the response of said moving means, means for disabling the performance of said signal controlled apparatus during the postponement of operation of said moving means, and means included in the disabling means for interrupting the operation thereof.

16. In a linecasting and composing machine, a composition controlling mechanism shiftable into communicative relation with each of a plurality of matrix storage magazines, a shifting device for moving said composition controlling mechanism from one position to another, a record reader responsive to the signals in a perforated control form for operating said composition controlling mechanism and said shifting device including a continuously rotatable operating shaft, means for postponing the response of said shifting device, means for disabling said record reader during the postponement of the operation of said shifting device without arresting said shaft, and means actuated by the disabling means for interrupting the operation thereof.

17. In a linecasting and composing machine, a plurality of matrix storage magazines, a composition controlling mechanism selectively shiftable into communicative relation with each of said magazines, means responsive to stored signals for shifting the composition controlling mechanism, means for delaying the response of said shifting means, and means operable simultaneously with the shifting means for discontinuing the operation of the delaying means.

18. In a line composing machine, an automatic control unit including a record reader, a shift mechanism, a set of matrix release elements alternatively conditioned by said shift mechanism, and means to arrest the performance of said record reader during the selection of said shift mechanism.

19. In a line composing machine, an automatic control unit, a plurality of matrix storage magazines, means for selectively conditioning each of said storage magazines to be controlled by said unit, and means for momentarily suspending the operation of said unit during the performance of said selecting means.

20. In a linecasting and composing machine, a plurality of matrix storage magazines, a composing control device, means for establishing operative association between said magazines and said device selectively, apparatus responsive to stored signals for actuating said association establishing means, and a delay mechanism for suspending the performance of said association establishing means in its response to said stored signals for the duration of a predetermined interval.

21. In a linecasting and composing machine, a plurality of magazines, a set of composition control elements, automatic means responsive to stored signals for establishing operative association between said set of elements and said magazines selectively including a pair of selectable actuating members, latching means associated with said members, and an intermediate member connecting said elements reciprocally whereby the actuating movement of each effects the restorative movement of the other.

22. In a linecasting and composing machine, a plurality of matrix storage magazines, a set of actuator means for establishing operative association between said magazines and said set of actuators selectively, a record reader responsive to signals in a perforated control form for operating said actuators and said association establishing means including a continuously rotatable operating shaft, and means for disabling said record reader without arresting said shaft.

EDWARD S. LARSON.